Aug. 2, 1960     W. R. EARLE ET AL     2,947,116
METHOD OF PRODUCING TISSUE CULTURE FLASKS
Original Filed Feb. 26, 1954
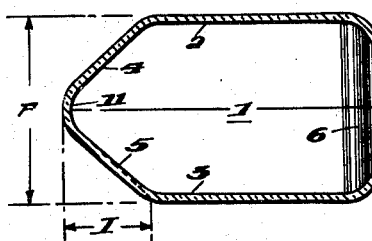
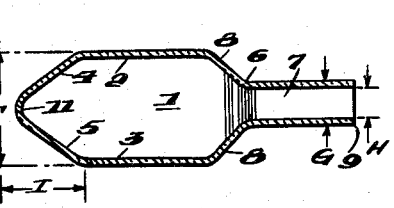
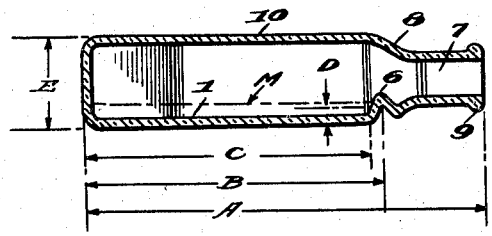
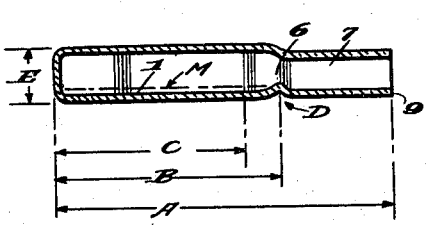
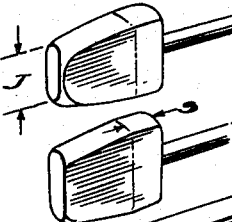
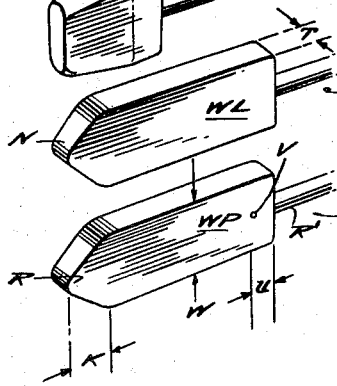
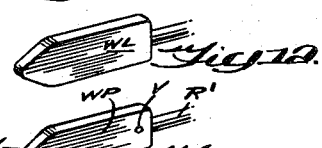
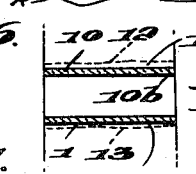
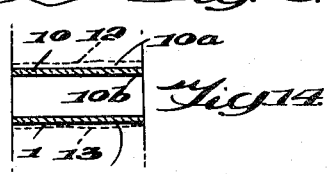
INVENTORS
WILTON R. EARLE,
FREDERICK HIGHHOUSE,
BY
ATTORNEY

United States Patent Office 2,947,116
Patented Aug. 2, 1960

2,947,116
METHOD OF PRODUCING TISSUE CULTURE FLASKS

Wilton R. Earle, Burtonsville, and Frederick Highhouse, Germantown, Md., assignors to the United States of America as represented by the Secretary of Health, Education, and Welfare Original application Feb. 26, 1954, Ser. No. 412,967, now Patent No. 2,858,036, dated Oct. 28, 1958. Divided and this application Apr. 22, 1958, Ser. No. 736,429

4 Claims. (Cl. 49—79)

(Granted under Title 35, U.S. Code (1952), sec. 266)

The invention described herein may be manufactured and used by or for the Government of the United States for governmental purposes without the payment to us of any royalty thereon in accordance with the provisions of the act of April 30, 1928 (ch. 460, 45 Stat. L. 467).

This application is a division of our copending application Ser. No. 412,967, filed February 26, 1954, now Patent No. 2,858,036, issued October 28, 1958, which relates to tissue culture flasks particularly adapted for the growth of tissue cells in vitro, and the invention herein claimed relates to a method of producing such flasks.

Procedures have heretofore been published by which tissue cultures can for the first time be set up with high accuracy as replicate cultures, the cells growing on the surface of cellophane or directly on the glass surface of a flask. In this type of culture work, the proliferation of the cells can be followed using special procedures involving the enumeration of the cell nuclei.

These methods have required the provision of new types of culture flasks, since no culture flasks heretofore in use were satisfactory, more particularly, because culture vessels heretofore available were adapted for plasma substrate tissue cultures rather than for cultures growing on surface substrates; it being understood that the term "surface substrate cultures" denotes cultures in which the cells adhere to and migrate along the surface of a cell support, such as a sheet of cellophane or glass, as distinguished from cultures wherein the cells are embedded in and migrate through a matrix, such as a plasma jell.

Thus the successful development and application of surface substrate methods of tissue culture requires the provision of new and improved culture vessels particularly adapted to maintain uniform conditions for surface substrate proliferation, and to facilitate maintenance and control thereof.

Prior attempts were made to produce surface substrate culture flasks by mold blowing. As glass is blown in a mold, however, the glass stretches unevenly. Therefore, as with all mold blown bottles, the mid part of both the top and bottom walls (the larger walls) of the flask were relatively thick, while at the corners and edges where the top and bottom walls join the sides, the glass was much thinner. Flasks fabricated in this way were, therefore, far from satisfactory since in instances the flask corners were so fragile that the flask would shatter during handling or centrifuging. An even more serious defect was that the thickness of the culture fluid layer over the flask floor was very irregular, being thick along the edges and thin near the middle of the floor. Consequently, there was no assurance that living cells adhering to various areas of the surface of the flask floor were under comparable conditions with respect to the media with which they were in contact.

The present invention has for its principal object the provision of improved tissue culture flasks avoiding the difficulties and curing the disadvantages of the flasks heretofore available. More specific main objects, severally and interdependently, are the provision of a tissue culture flask having an extremely level culture floor, one having an extremely regular wall thickness; one formed to facilitate observation and low power microscopic examination of the proliferating cells; one adapted for centrifugation; one minimizing the adherence of cells to sloping floors and the exposure of cells above the surface to culture fluid; a small flask proportioned to prevent meniscus effects from interfering excessively with the evenness of distribution of the culture medium on the floor of the flask; and a method of producing such flasks in a new and relatively inexpensive manner.

Other objects and advantages of the invention and special features and procedures contributing to the realization of the main objects will be apparent from the following description of preferred embodiments of the invention.

The invention resides in the novel method for producing an improved flask construction, as hereinafter exemplified, and will be more particularly pointed out in the appended claims.

In the accompanying drawing of illustrated embodiments of the invention:

Figs. 1 and 2 are horizontal and vertical cross sections through one embodiment of flask producible by the invention.

Figs. 3 through 7 are perspective views of the mandrels preferably employed in forming the body of the flask of Figs. 1 and 2.

Figs. 8 and 9 are horizontal and vertical cross sections through a modified embodiment.

Figs. 10 through 13 are perspective views of mandrels preferably employed in forming the body of the flask of Figs. 8 and 9.

Fig. 14 is a diagram indicating how the flasks formed with flat internal roof and floor walls may have the outer surfaces of these walls shaped into parallelism with their inner surfaces to facilitate low power microscopic inspection and even illumination of the culture.

As shown in the drawings, the present invention is adapted for the production of flasks of various sizes. Small flasks are important for experimental work in which culture areas as small as 15 square centimeters or less are desirable. The larger sizes are needed to afford sufficient culture area for the further proliferation of already established and rapidly growing tissue culture stocks. The optical quality, particularly of the smaller flasks, is important to provide for low-power microscopic examination of the growing tissue cells. This is necessary, since in applicants' experience, no quantitative studies can safely ignore the general condition of the cells and the culture as determined by such examination.

Furthermore, as shown in the drawings, the flasks, that preferably have parallel roof and floor walls, in accordance with the invention are laterally tapered at the ends thereof opposite to the throat or neck openings therein, the floor, and preferably also the roof, however, extending in an unbroken plane from the main body portions of the flasks to the extremities of the laterally tapered ends thereof, the advantages of these provisions being more fully explained hereinafter.

Turning now to Figs. 1 and 2, the flask therein shown is typical of one of the larger sizes of flasks currently produced in accordance with the invention, and represents a flask having a floor area of say 60 sq. cm. The floor 1 of the flask in the normal proliferating position thereof is horizontal, as shown in the vertical elevation, Fig. 2, and its area is measured between the side walls 2, 3, and between the end walls 4, 5 and the dam 6, which dam is located between the flask floor 1 and the flask throat 7 in the shoulder region 8 of the flask. The throat portion or neck 7 of the flask in these larger sizes is usually finished with a beaded edge 9, and is preferably formed of cylindrical tubing of a size sealable with a standard sized stopper or cork of rubber or other suitable material. The roof 10 of the flask that overlies the floor 1 is preferably parallel thereto, and the walls 2, 3, 4, and 5 bounding the floor are preferably vertical.

As best illustrated in Fig. 1, the flask is of generally polygonal form, and as shown in Fig. 2, its floor 1 and roof 10 are interconnected at one end by the shoulder walls 8, and the side walls 2, 3, 4, 5 interconnect the same throughout the remainder of the peripheries of the roof and floor walls. The throat or neck 7 opens through the shoulder walls 8. The side walls 2, 3, 4, 5 define a polygonal area comprising a triangular area between the walls 4 and 5 at the opposite end of the flask from the throat 7, and the floor 1 is internally planar and extends in a flat unbroken plane from the shoulder walls 8 to the extremity 11 (Fig. 1) of the said triangular area.

By this particular construction, when the flask is upended, free floating cells settle out of the fluid in the extremity 11, or can be separated out into such extremity by slow centrifugation, allowing the supernatant culture fluid to be drawn off and replaced. Furthermore, since the floor 1 is extended on the same flat level clear to the extremity 11, when the cells are washed back into the pool of culture medium M (Fig. 2) or grow along the floor underlying the same, there is no sloping floor near the extremity 11 for the cells to adhere to or proliferate along that might expose such cells above the surface of the culture fluid M, or at least under a thinned area thereof where they would not be subjected to the same nutrient conditions as those in the main body of the flask between the walls 2 and 3.

Also as shown in Fig. 2, in this embodiment the roof wall 10 is parallel to the floor wall 1, and is also internally planar and extends in a flat unbroken plane from the shoulder walls 8 to the extremity 11 of the triangular portions thereof between the walls 4 and 5. This construction is of advantage as it facilitates visual observation or low power microscopic examination of the culture, especially when combined with the features about to be described in connection with Fig. 14, after a brief reference to the presently preferred method of making the flask, that will later be described in greater detail.

As will be apparent when the method is fully described, the planar internal faces of the floor 1 and roof 10 are preferably produced by shaping the body of the flask on mandrels (Figs. 3–6) with final shaping on a polished, plane faced mandrel (Fig. 7) and thus are level and polished, in the case of the surface of the floor 1, and flat and polished in the case of the under surface of the roof 10. As the glass in the preferred method of shaping on the mandrel (Fig. 7), is worked to reduce irregularities in its thickness, the outer surfaces of the room 10 and floor 1, in the absence of special provisions, are not optically flat, but may be somewhat irregular, as indicated by the dotted lines 12, 13 in Fig. 14. Thus one of the features of the invention is to provide the roof wall with a flat, planar, external surface 10a parallel to its planar internal flat surface 10b, to thereby provide for, and avoid distortion in, visual observation of the culture, and more particularly low power microscopic observation thereof. The planar surface 10a preferably extends throughout the entire areas of the roof 10, and may be formed in any suitable way, its formation by grinding and polishing being preferred. Similarly, as shown in Fig. 14, the outer surface 1a of the floor 1 may be, at least in part, and preferably throughout all of its extent, formed as a polished surface parallel to the flat planar inner surface of the floor, this being desirable to reduce refractions of light when the cells and culture are illuminated through the floor, and to insure level standing of the interior of the floor when the flask is rested on a plane level surface or the like.

Finally, just as the extension of the floor area as a level plane to the extremity 11 (Fig. 1) insures maximum uniformity of the conditions to which cells are exposed near that end of the flask, so the provision of the dam 6, between the floor area and the throat or neck 7, insures against flowage of the culture medium up into the throat area and presents a steep, rather than a sloping, termination of the floor 1 at that end of the flask. As shown in Fig. 1, the dam 6 is preferably formed in the shoulder area of the flask or at its juncture with the floor area, as will be more fully described in connection with the preferred method of making the flask.

As above mentioned, Figs. 3 through 7 illustrate the types of mandrels employed in making the flasks of which Figs. 1 and 2 are typical. These flasks for purposes of economy are preferably made from round glass tubing such as standard wall "Pyrex" No. 7740 tubing. In fashioning the body for each flask, a length of tubing is cut that is somewhat longer than the length of the flask body to be made, as will appear later from Table I. The length of tubing is treated in a broad and bushy flame to a temperature at which it is somewhat plastic. While in the flame it is laterally stretched and flattened by rapidly and consecutively passing down into it, and then withdrawing, each of a series of flat and progressively broader mandrels, suitably handled. Three such mandrels, as illustrated in Figs. 3, 4, and 5, are generally used in shaping the tubing for the larger sized flasks to form a blank of rectangular internal cross section throughout its body region. There is then passed into the rectangular cross section blank a mandrel (Fig. 6) of rectangular cross section that has a laterally tapered nose end N the top and bottom faces of which are coplanar with the main faces or roof and floor walls WL of the mandrel. This mandrel is preferably slightly oversize compared to the final mandrel (Fig. 7), as exemplified hereinafter in Table II. The heating being continued, the nose walls 4 and 5 (rough) are formed by flowing the glass of the tube over the nose end N of the mandrel to form the closed end or apex 11 on the blank. There is then inserted in the so closed blank a precisely dimensioned and highly polished cast iron vacuum mandrel (Fig. 7) having the exact configuration of the interior of the body and closed end of the flask to be made (disregarding shrinkage), and having its broad faces or walls WP parallel, for shaping and highly polishing the inner surfaces of the roof, sides and floor of the flask. While the blank is being shrunk on the mandrel (the vacuum applied through openings V and the hollow handle R' in this operation shrinking all the walls 1, 2, 3, 4, 5, and 10 against the mandrel) the heat is raised somewhat and the preparation is hand worked in the flame to further equalize the thickness of the glass over the top, bottom, sides and pointed end of the mandrel. This final mandrel (Fig. 7) is then withdrawn, the vacuum being relieved, and the formed flask body is cooled.

After a number of formed flask bodies have been thus prepared, the part of the so-formed body near its open end is reheated in the flame and the shoulders 8 are then formed by drawing down and shaping, and blowing and working, the extra length of the formed body blank near its open end. The shoulder portion 8 is thus formed with an opening of reduced size to fit the size neck or throat to be applied to the flask. A neck or throat 7, usually of cylindrical tubing ("Pyrex" in the case mentioned) is then sealed on about the opening, and the fluid restricting ridge or dam 6 near the throat is formed by pressure with a V-shaped tool, after which the end of the throat is beaded or fire polished, beading being preferred for the larger sized flasks, and in some instances flaring of the throat for better gripping of the stopper being practiced.

The so finished flask is then oven annealed, preferably by raising the annealing oven temperature to 560° C., shutting off the heat, and gradually allowing the oven to cool to room temperature over a period of 12 hours or so.

The flasks as so formed and annealed have sufficiently strong walls to withstand slow speed centrifugation. Because of the method so far described for forming them, the outer surfaces of the walls, more particularly of walls 10 and 1, are not truly planar and not necessarily truly parallel to the planar inner surfaces of these walls. To provide for more perfect visual and photographic recording of cell morphology, it is contemplated that at least a part, and preferably all, of the outer side of the roof wall 10 be formed as a planar surface parallel to its internal planar surface, this step preferably being accomplished by grinding and polishing in the same manner normally used in polishing plate glass or optical glass. When desired, similar grinding and polishing may be employed to level the outer surface of the floor wall 1, as well.

As above mentioned, it is desirable to produce these flasks, whether of small or large floor area, with relatively wide floor areas, so that even in the case of a small sized flask neither the width nor the length of the body is reduced to a dimension in which the meniscus effect of a pool of nutrient solution covering the floor of the flask would materially thin the depth of the central portion of the pool. This desideratum also reduces the numbers of sets of mandrels needed to make flasks of a full range of sizes, since several sizes of flasks can be made with one set of mandrels merely by working on shorter or longer cut sections of glass tubing, so that the change in area for several sizes of flasks is accomplished by change of the length dimension, C minus I, in Figs. 1 and 2.

Turning now to Figs. 8 and 9, it will be noted that the flask therein shown is generally similar to, though smaller than, the flask of Figs. 1 and 2, the principal differences being in the relative size of the throat 7, in the location of the dam 6 at a somewhat more advanced position between the lateral shoulder walls 8, and in the fire polishing of the end 9 of the throat or neck, without beading the same.

In making the smaller series of flasks, typified in Figs. 8 and 9, four mandrels, as illustrated in Figs. 10-13, may be used, instead of the five preferred for making the larger flasks, the method of procedure following that previously set forth.

As typifying the sizes of flasks found particularly desirable for the several stages of tissue culture proliferation, illustrative dimensions of four blanks, referred to in the drawings by reference letters, are set forth in Table I, in which the "T" number designates the approximate floor area of each tissue flask in square centimeters, the dimensions being given in millimeters, and further details and illustrations pertaining to such flasks are set forth in the inventors' article published in the Journal of the National Cancer Institute, volume 14, No. 4, February 1954, pages 841–851, incorporated herein by reference.

*Table I.—Dimensions of T flasks in mm. with additional details*

| Flask designation | T-9 | 15 | 30 | 60 |
|---|---|---|---|---|
| Length of initial tube used for making blank | 100 | 100 | 165 | 210 |
| Outside diameter of original tube used for making blank | 25 | 25 | 35 | 54 |
| Length of finished blank used for making flask | 90 | 90 | 135 | 170 |
| A. Overall length | 80 | 100 | 140 | 165 |
| E. Outside thickness | 14.5 | 14.5 | 20 | 29.5 |
| F. Overall width | 32 | 32 | 46 | 72 |
| I. Outside length of bottom angle | 19 | 19 | 20 | 30 |
| D. Outside depth of ridge | 4 | 4 | 6 | 6 |
| C. Length of straight part of body | 25 | 40 | 70 | 90 |
| B. Length from ridge to bottom angle | 30 | 48 | 80 | 95 |
| H. I.D. throat, 15 mm. from tip | 10.5 | 10.5 | 12 | 15.5 |
| H. I.D. throat, 3 mm. from tip | | | | 16.5 |
| G. O.D. throat, 15 mm. from tip | 13 | 13 | 15 | 18 |
| End of throat | straight | straight | rolled bead | heavy rolled bead |
| Standard Rubber stopper, size for sealing | 00 | 00 | 0 | 2 |

As typifying further the dimensions and other data for mandrels preferably employed for forming these typical flasks, also referred to the drawings by reference letters, illustrative data are set forth in Tables II, III, and IV for three sets of mandrels (dimensions in inches).

*Table II.—Mandrels for shaping smaller flasks e.g. T-9 and T-15*

| Fig. # | 10 | 11 | 12 | 13 |
|---|---|---|---|---|
| Material | Graphite | Graphite | Graphite | Iron. |
| Finish | Ground | Ground | Ground | Polished. |
| Nose Angle | | | 60° | 60°. |
| Radii on corners | 3/16 | 3/16 | 1/8 | 1/8. |
| Dimensions* (in inches): | | | | |
| L—Length | 1 1/8 | 1 1/8 | 3 1/2 | 3 1/2. |
| J—Tip | 1/2 | 1/2 | | |
| S—Straight | 1/8 | 3/16 | | |
| T—Thickness | 0.470 | 0.475 | 0.465 | 0.455. |
| W—Width | 1 | 1 3/16 | 1.55 | 1.140. |
| K—Nose Length | | | 3/4 | 3/4. |
| R—Nose Radius | | | 15/64 | 15/64. |
| U—Vac. Port Loca. | | | | 5/32. |
| V—Vac. Port Dia. | | | | 3/8. |
| (Both sides of tool) | | | | |

*For location of dimensions see single examples in Figs. 3–7.

*Table III.—Mandrels for shaping medium sized flasks e.g. T-30*

| Fig. # | 10 | 11 | 12 | 13 |
|---|---|---|---|---|
| Material | Graphite | Graphite | Graphite | Iron. |
| Finish | Ground | Ground | Ground | Polished. |
| Nose Angle | | | 60° | 60°. |
| Radii on corners | 3/16 | 3/16 | .010 | .010. |
| Dimensions* (in inches): | | | | |
| L | 2 1/4 | 2 1/4 | 4 3/4 | 5. |
| J | 7/8 | 1 1/8 | | |
| S | 1/12 | 3/4 | | |
| T | 0.670 | 0.650 | 0.640 | 0.625. |
| W | 1.4 | 1.575 | 1.635 | 1.615. |
| K | | | 1 1/16 | 1 1/16. |
| R | | | 1/4 | 1/4. |
| U | | | | 3/16. |
| V | | | | 5/32. |

*For locations of dimensions see single examples in Figs. 3–7.

*Table IV.—Mandrels for shaping larger flasks e.g. T-60*

| Fig. # | 3 | 4 | 5 | 6 | 7 |
|---|---|---|---|---|---|
| Material | Graphite | Graphite | Graphite | Graphite | Iron. |
| Finish | Ground | Ground | Ground | Ground | Polished. |
| Nose Angle | | | | 90° | 90°. |
| Radii on corners | 1/2 | | 1/8 & 5/16 | .010 | .010. |
| Dimensions (in inches): | | | | | |
| L | 3 | 3 | 3 | 6 3/4 | 6 3/4. |
| J | 1 1/4 | 1 7/8 | 2 3/8 | | |
| S | 5/16 | 1 | 1 | | |
| T | 1.070 | 0.955 | 0.995 | 0.975 | 0.960. |
| W | 2 3/16 | 2 7/16 | 2 5/8 | 2.65 | 2.630. |
| K | | | | 1 1/8 | 1 1/8. |
| R | | | | 7/16 | 3/16. |
| U | | | | | 1 1/16. |
| V | | | | | 1/4. |

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

We claim:

1. In a method of forming a tissue culture flask, the combination of steps comprising heating a length of cylindrical tube somewhat longer than the length of flask body to be made until it is somewhat plastic and while continuing such heating rapidly and consecutively passing into it, and then withdrawing, each of a series of several flat faced and progressively broader mandrels to form a blank of rectangular internal cross section; passing into the so formed blank a mandrel of rectangular cross section that has a laterally tapered nose end, the top and bottom faces of which are coplanar with the main faces of the mandrel, and heating and flowing the glass of the tube over the laterally tapered nose end of said mandrel to form a closed end on the blank; inserting in the so closed blank a polished cast iron vacuum mandrel having the exact configuration of the interior of the flask to be made, and having its broad faces parallel for internally shaping the roof and floor of the flask body and, while further heating the flask, vacuum shrinking the closed end and flask-body thereon to precisely dimension and highly polish the inner surfaces of the roof, sides and floor of the flask; and removing the vacuum mandrel and cooling the so formed flask body.

2. A method comprising the forming of a flask body in accordance with claim 1, further comprising the steps of reheating the part of the flask body near its open end, drawing down and shaping the same to form a shoulder portion leading to an opening of reduced size, sealing a cylindrical throat thereto about said opening, and pressing an upstanding ridge in the floor of the flask extending transversely of the shoulder region thereof adjacent the internally planar floor of the flask.

3. A method according to claim 2, further comprising the steps of grinding and polishing the exterior surface of at least a part of the roof of the flask to facilitate visual inspection therethrough.

4. In a method of forming a tissue culture flask, the combination of steps comprising heating a length of cylindrical tube somewhat longer than the length of flask body to be made until it is somewhat plastic and while continuing such heating rapidly and consecutively passing into it, and then withdrawing, each of a series of several flat faced and progressively broader mandrels to form a blank of rectangular internal cross section; passing into the so formed blank a mandrel of rectangular cross section that has a laterally tapered nose end the top and bottom faces of which are coplanar with the main faces of the mandrel, and heating and flowing the glass of the tube over the laterally tapered nose end of said mandrel to form a closed end on the blank; inserting in the so closed blank a polished cast iron vacuum mandrel having the exact configuration of the interior of the flask to be made, and having its broad faces parallel for internally shaping the roof and floor of the flask body, and while further heating the flask vacuum shrinking the closed end and flask-body thereon to precisely dimension and highly polish the inner surfaces of the roof, sides and floor of the flask while working the glass to more nearly equalize the thickness of the blank over the top, bottom, sides and nose end of the mandrel; and removing the vacuum mandrel and cooling the so formed flask body.

References Cited in the file of this patent

UNITED STATES PATENTS

| | | |
|---|---|---|
| 1,301,714 | Kueppers | Apr. 22, 1919 |
| 1,999,525 | Morscholz | Apr. 30, 1935 |
| 2,084,811 | Keen | June 22, 1937 |
| 2,771,710 | Molinari et al. | Nov. 27, 1956 |

FOREIGN PATENTS

| | | |
|---|---|---|
| 666,267 | Germany | Oct. 14, 1938 |